3,488,383
DECOMPOSITION OF FORMIC ACID
Robert Stevenson Coffey, Norton-on-Tees, England, assignor to Imperial Chemical Industries Limited, London, England, a corporation of Great Britain
No Drawing. Filed Mar. 30, 1967, Ser. No. 626,969
Claims priority, application Great Britain, Apr. 4, 1966, 14,845/66
Int. Cl. C07c 67/06, 51/42
U.S. Cl. 260—499                    9 Claims

ABSTRACT OF THE DISCLOSURE

Formic acid is selectively decomposed in mixtures of formic acid with aliphatic acid esters or with other aliphatic acids by contacting the mixture with a soluble complex of a Group VIII metal or rhenium.

---

This invention concerns the selective decomposition of formic acid.

According to the present invention a process for the selective decomposition of formic acid in admixture with another aliphatic acid or an ester of an aliphatic acid comprises contacting the formic-acid-containing mixture with a complex compound of a Group VIII metal or rhenium which is soluble in the mixture during the decomposition process.

The process is particularly effective for decomposing formic acid in mixtures of formic and acetic acids; it may, however, also be used for the decomposition of formic acid in admixture with other aliphatic acids or esters of aliphatic acids, for example formate or acetate esters, including methyl formate, methyl acetate and glycol monoacetates and diacetates.

The complex compound is preferably a compound of a noble metal of Group VIII, such as platinum, osmium, rhodium or, preferably, ruthenium or iridium. It may be introduced as a preformed complex or, for example, as a ligand and a salt, for example a halide, nitrate or carboxylate. The halide is preferably a chloride, bromide or iodide, complexes of iridium trichloride being particularly advantageous. The ligand contains an atom of an element which is capable of forming a co-ordinate bond with the metal component of the salt, such an element preferably being phosphorus, arsenic, or sulphur. Examples of suitable ligands are primary, secondary or tertiary phosphines or arsines and alkyl, aryl or cyclo-alkyl phosphites, sulphoxides or sulphones. Preferred ligands are tertiary phosphines and arsines.

Specific examples of complexes which have been found useful in this invention are $IrH_xHal_{3-x}P_{n3}$; $IrH_xHal_{3-x}P_{n2}$;

$IrH_xHal_{3-x}(CO)P_{n2}$; $IrHal(CO)P_{n2}$; $RhHal_3P_{n3}$;

$RuHHal(CO)P_{n3}$; $RuHHal(CO)_2P_{n2}$; $OsHHal(CO)P_{n3}$; and $OsHHal(CO)_2P_{n2}$; where $x=0$ to 3, $P_n$ represents a tertiary phosphine or arsine, and Hal represents a Cl, Br or I atom.

Preferred complexes have the formula $IrH_3(PAr_3)_3$ in which Ar is a phenyl or substituted phenyl group.

The reaction is preferably carried out at an elevated temperature, normally above 40° C., and more preferably at above 100° C. In the case of a mixture of formic and acetic acids, it is advantageous to reflux the mixture at 110° to 120° C. depending upon the composition of the mixture. If desired an elevated pressure may be used thereby enabling the decomposition to be carried out at higher temperatures.

The process of the invention is effective with mixtures containing widely different concentrations of formic acid, for example from 1% to 50% by weight of the mixture. With concentrations of formic acid as low as 1% by weight of the mixture, the process affords virtually compete destruction of the formic acid present. The quantity of the complex compound which is employed may be as low as $3 \times 10^{-4}$ moles/litre of the mixture but it is preperred to use at least $3 \times 10^{-3}$ moles/litre or more to improve the rate of decomposition. The upper limit is governed by the solubility of the complex compound but it is normally unnecessary to use such a high concentration.

The mixture may contain minor proportions of for example ketones, paraffins and aromatic hydrocarbons.

We have also found that by adding a base to the reaction mixture the initial rate of decomposition of formic acid is increased. Suitable bases are the alkali metal, alkaline earth metal or ammonium carboxylates, carbonates and hydroxides, for example sodium acetate and may be added in the proportions of 1 to 5 moles per mole of complex, preferably 2 to 3 moles of base per mole of complex.

The invention is illustrated by the following examples.

EXAMPLE 1

A solution of 0.3 gram of $(IrCl_3(P.Et_2Ph)_3)$ in 5 mls. acetic acid together with 5 mls. formic acid was refluxed under nitrogen. During a period of 1½ hours, 5100 mols. of a gas containing carbon dioxide was evolved. On cooling the solution the complex crystallised out unchanged. A similar solution of the complex in acetic acid but without any formic acid present was found to be stable to heat. It is apparent that at least part of the formic acid is decomposed to hydrogen and carbon dioxide and it was shown by mass spectroscopy that the ratio of $H_2:CO_2$ approximated to 1:1.

EXAMPLE 2

The procedure of Example 1 was repeated using a solution of 0.3 gram $(IrCl_3(P.Et_2Ph)_3)$ in 19 mls. acetic acid together with 1 ml. formic acid. During 90 minutes of refluxing under nitrogen, 850 mls. of gas was evolved. The procedure was again repeated using a 3% solution of formic acid in labelled $C_{14}$ acetic acid and it was shown that only 2.6% of the carbon in the gas evolved originated from the acetic acid.

EXAMPLE 3

The procedure of Example 1 was repeated using a solution of 0.3 gram of $(RhCl_3(AsEt_2Ph)_3)$ in 5 mls. acetic acid together with 5 mls. formic acid. During 60 minutes of refluxing under nitrogen 2,500 mls. of gas was evolved.

EXAMPLE 4

The procedure of Example 1 was repeated using a solution of 0.09 gram of $[RuHBr.Co.(PEt_2Ph)_3]$ in 19.4 mls. of acetic acid and 0.6 ml. of formic acid. After 1 hour 1,445 mls. of gas had been evolved and after 75 minutes 1,585 mls. had been evolved. The resulting solution was shown to contain less than 0.5% formic acid.

EXAMPLE 5

A solution of $[IrH_3(PPh_3)_3]$ (0.0102 g.) in n-octyl formate (1 cc.) was heated to 100°–110° C. when a solution of formic acid (0.1 cc.) in n-octyl formate (1 cc.) was added. Gas evolution began at once and after 1 hour 100 cc. of gas were evolved (83% the amount corresponding to 100% decomposition of the formic acid). A second sample of formic acid (0.1 cc.) was added and gas evolution then increased.

EXAMPLE 6

A solution of $[IrH_3(PPh_3)_3]$ (0.197 g.) in acetic acid (19 cc.) was heated to reflux and 1 cc. of formic acid was added. Gas evolution occurred at once and more than 1250 cc. of gas were evolved in 3 inutes. 68 successive 1 cc. amounts of formic acid were then added and from the last sample added 1250 cc. of gas were evolved in 5 minutes. The catalyst was still active after 2.2 moles of formic acid had been added.

EXAMPLE 7

Example 6 was repeated in the presence of an excess of triphenylphosphine ($4.1 \times 10^{-2}$ m.) which preserved the catalyst life even further. After 89 additions of 1 cc. amounts of formic acid the last formic acid sample completely decomposed within 4 minutes.

EXAMPLE 8

A solution of [$IrH_3(PPh_3)_3$] (0.05 g.) in acetic acid (10 cc.) containing 5% by volume of formic acid was heated at 50° C. when gas was evolved at a rate of 0.5 moles/litre/hour. After 3 hours no formic acid could be detected. In the presence of 10% paraffin, aromatic hydrocarbon or ketone a similar quantity of gas was evolved at approximately ⅔ the aforesaid rate.

EXAMPLE 9

The following complexes were tested for catalytic activity by refluxing solutions of them in acetic acid and injecting formic acid into the solution. The rate of evolution of $CO_2$ and hydrogen was compared and all samples gave off $CO_2$ and hydrogen.

| Complex | Concentration of complex (moles/litre) | Formic acid concentration (percent by volume) | Time taken to decompose 50% of formic acid present |
|---|---|---|---|
| $Ru_3(CO)_{12}$ | $5 \times 10^{-3}$ | 2.5 | 90 minutes. |
| $RuHCl((CH_2P\phi_2)_2)_2$ | $1.7 \times 10^{-3}$ | 3 | 48 minutes. |
| $RuHCl((CH_2PEt_2)_2)_2$ | $1.7 \times 10^{-3}$ | 3 | 13 minutes. |
| $OsH_2((CH_2PEt_2)_2)_2$ | $6.2 \times 10^{-3}$ | 3 | >2 hours. |
| $PtCl_2(PBu_3)_2$ | $6.2 \times 10^{-3}$ | 3 | 76 ccs. in 3 hours. |
| $RhCl_3(PEt_2\phi)_3$ | $6.2 \times 10^{-3}$ | 3 | 143 ccs. in 30 minutes. |
| $IrCl_3PBu_3$ | $6.2 \times 10^{-3}$ | 3 | 35 minutes. |
| $IrHCl_2(PEt_2\phi)_3$ (yellow isomer) | $6.2 \times 10^{-3}$ | 3 | 30 minutes. |
| $IrHCl_2(PEt_2\phi)_3$ (white isomer) | $6.2 \times 10^{-3}$ | 3 | 10 minutes. |
| $IrH_2Cl(PEt_2\phi)_3$ | $6.2 \times 10^{-3}$ | 3 | 2 minutes. |
| $IrHCl_2(P\phi_3)_3$ | $6.2 \times 10^{-3}$ | 3 | 2½ minutes. |
| $IrH_2Cl(P\phi_3)_3$ | $6.2 \times 10^{-3}$ | 3 | 4 minutes. |
| $IrH_3(P\phi_3)_3$ | $1.24 \times 10^{-3}$ | 3 | 1½ minutes. |
| $IrH_3(P\phi_3)_2$ | $6.2 \times 10^{-4}$ | 3 | 40 minutes. |
| $IrH_3(PEt_2\phi)_3$ | $1.03 \times 10^{-3}$ | 5 | <1 minute |
| $IrClCO(P\phi_3)_2$ | $6.2 \times 10^{-3}$ | 3 | 25 minutes. |
| $Ir(\phi_2PC_2H_4P\phi_2)_2Cl$ | $7.7 \times 10^{-3}$ | 3 | 150 minutes. |
| $IrCl_3(SO(CH_3)_2)_3$ | $6.2 \times 10^{-3}$ | 3 | 50 ccs. in 140 minutes. |
| $ReOCl_3(P\phi_3)_2$ plus $P\phi_3$(.13 M) | $3 \times 10^{-2}$ | 33.3 | 455 ccs. in 1 hour. |

Without $P\phi_3$ only 22 ccs. of gas evolved in 5 hours.
$\phi$ in this table represents a phenyl group.

EXAMPLE 10

A mixture of acetic acid (14.4 cc.) and formic acid (0.6 cc.) was refluxed and triphenylphosphine (0.157 g.) added. A slurry of chloriridic acid (0.0448 g. in 5 cc. acetic acid) was added and was evolved at a rate of 0.5 cc. per minute for 50 minutes, when refluxing was stopped.

What is claimed is:
1. A process which comprises selectively decomposing formic acid in a mixture consisting essentially of formic acid and another aliphatic acid or an ester of an aliphatic acid, by contacting the formic acid-containing mixture in the liquid phase at temperatures above 40° C. with a complex compound selected from the group consisting of compounds having a formula $IrH_xHal_{3-x}P_{n3}$;

$IrH_xHal_{3-x}P_{n2}$;

$IrH_xHal_3(CO)P_{n2}$; $IrHal(CO)P_{n2}$; $RhHal_3P_{n3}$;

$RuHHal(CO)P_{n3}$;

$RuHHal(CO)_2P_{n2}$; $OsHHal(CO)P_{n3}$ and $OsHHal(CO)_2P_{n2}$;

where $x=0$ to 3, $P_n$ represents a tertiary phosphine or arsine and Hal represents a Cl, Br or I atom;

$PtCl_2(PBu_3)_2$ and $ReOCl_3(P\phi_3)_2$ where $\phi$ represents phenyl, said complex compound being soluble in the mixture during the reaction process.

2. A process as claimed in claim 1 in which the complex compound is a compound of a noble metal of Group VIII, and the decomposition is carried out at the reflux temperature of the mixture.

3. A process as claimed in claim 2 in which the mixture consists essentially of formic acid and a member selected from the group consisting of acetic acid, methyl formate, methyl acetate, glycol monoacetate and glycol diacetate.

4. A process as claimed in claim 3 in which a minor proportion of a ketone, paraffin or aromatic hydrocarbon is present.

5. A process as claimed in claim 3 in which the complex has the formula $IrH_3(PAr_3)_3$ in which Ar is a phenyl.

6. A process as claimed in claim 2 whenever carried out above 100° C.

7. A process as claimed in claim 3 in which the concentration of formic acid is in the range of 1 to 50% by weight based on the weight of the mixture.

8. A process as claimed in claim 1, in which at least $3 \times 10^{-3}$ moles of the complex compound are present per litre of the mixture.

9. A process as claimed in claim 1 in which an alkali metal, alkaline earth metal or ammonium carboxylate, carbonate or hydroxide is introduced to the mixture in a proportion of from 1 to 5 moles per mole of complex.

References Cited

UNITED STATES PATENTS 3,384,659  5/1968  Bate _____ 260—541

FOREIGN PATENTS 855,751  12/1960  Great Britain.

LORRAINE A. WEINBERGER, Primary Examiner

V. GARNER, Assistant Examiner

U.S. Cl. X.R.

260—468, 478, 514, 540, 541, 586, 590, 593, 674